Jan. 1, 1957 E. G. BALDWIN 2,776,381

MULTIELECTRODE SEMICONDUCTOR CIRCUIT ELEMENT

Filed Jan. 25, 1952

INVENTOR
E. G. BALDWIN

BY H. L. Burgess

ATTORNEY 2,776,381

MULTIELECTRODE SEMICONDUCTOR CIRCUIT ELEMENT

Edwin G. Baldwin, East Orange, N. J., assignor to Bell Telephone Laboratories, Incorporated, New York, N. Y., a corporation of New York Application January 25, 1952, Serial No. 268,219

6 Claims. (Cl. 307—88.5)

This invention relates to semiconductor translating devices.

A principal object of the invention is to combine the functions of amplification and rectification into a compact, rugged translating unit.

Another object of the invention is to define such a semiconductor unit with but a single body of semiconductive material. A more particular object is a translating device of the type described which requires no substantially ohmic contacts with the semiconductive body.

Another object of the invention is a high speed amplifying electronic gate embodied in a compact translating device.

A translating device in accordance with a particular embodiment of the invention, to be described in more detail below, is housed within a single cartridge-like envelope. The envelope supports a single wafer of semiconductive material, which may be germanium. A pair of closely spaced electrodes make point contact with one side of the wafer, while a pair or more of electrodes also make point contact with the opposite side of the wafer. The first-mentioned pair of electrodes, together with the wafer and one of the latter electrodes, define a transistor-like amplifier. Each of the latter pair or more of electrodes together with the wafer defines an asymmetrically conducting impedance element. The terms "rectifier" and "rectifying elements" are used herein interchangeably with asymmetrical impedance elements. A plurality of functions are thus obtained with a unitary structure comprising but a single body of semiconductive material and a plurality of point contacts; no ohmic contacts are required.

The properties of semiconductive amplifying devices are described, for example, in a series of articles in the Bell System Technical Journal for July 1949, and also in a book entitled, "Holes and Electrons in Semiconductors", by W. Shockley, Van Nostrand, 1950.

Figure 1:
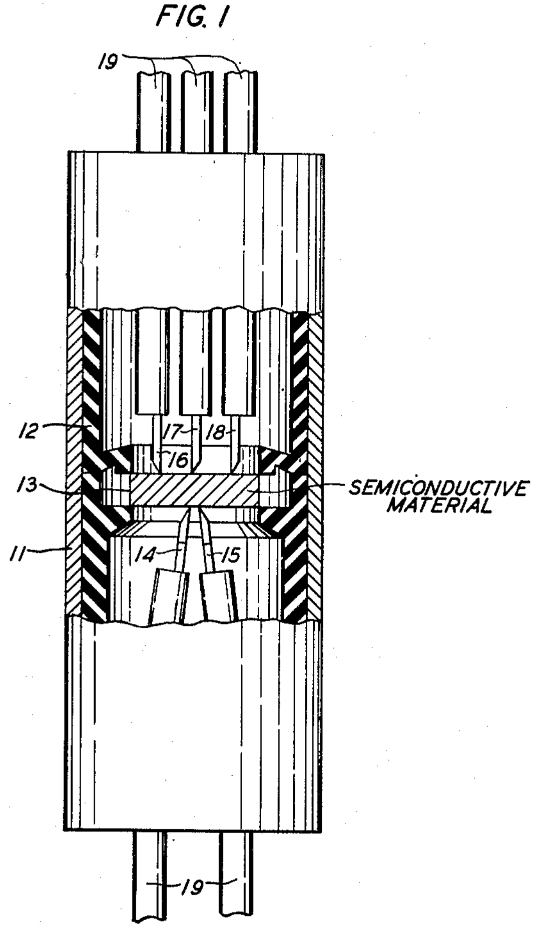
Figure 2:
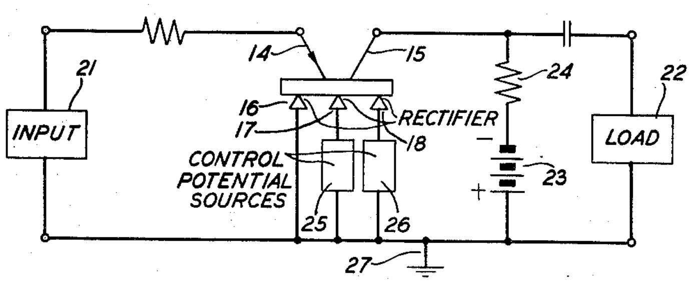

The invention, its objects, and features may be more fully understood from a consideration of the following detailed description when read in accordance with the attached drawing, in which:

Fig. 1 is a partially cut away view of a semiconductor translating device embodying principles of the present invention; and Fig. 2 illustrates a circuit application of the device illustrated in Fig. 1.

The translating device illustrated in Fig. 1 comprises a cylindrical metallic housing 11 and a mounting ring defined by a lining 12 of insulating material, which may, for example, comprise phenol linen. A wafer of semiconductive material 13, which may, for example, comprise germanium, is securely gripped by the mounting ring defined by the lining. Located on one side of the wafer are a pair of closely spaced electrodes 14 and 15, the points of which may be chisel-edged, which bear against one side of the wafer. The electrodes 14 and 15 are analogous to the emitter and collector electrodes of a conventional point contact transistor, as will become more apparent, and may, for example, be formed of Phosphor bronze. Located on the other side of the wafer are three additional electrodes 16, 17, and 18, the points of which may also be chisel-edged, and which bear against the latter face of the wafer. The latter electrodes are diode points and may, for example, be formed from tungsten. External connections may be made to the lead-in conductors 19 which may be supported within the housing 11 by insulating blocks or discs, not shown.

The contact points 14 and 15 serve as emitter and collector connections and, together with wafer 13 and at least one of the contact points 16, 17, and 18, for example, contact 16, define a transistor-like amplifier similar in many respects to the Type A transistor, as described, for example, in an article entitled, "Some circuit aspects of the transistor", by R. M. Ryder and R. J. Kircher, Bell System Technical Journal, July 1949, at page 33. The amplifier just defined, however, differs from the Type A transistor as therein described in one important respect, namely, there is no large area ohmic contact which is normally employed for the connection of a base electrode. Further, the use of a point contact for the base electrode is not merely a substitution, since it defines, together with wafer 13, an asymmetrically conducting impedance element which has particular utility in a transmission type gate to be described below. Contacts 17 and 18, together with wafer 13, in a similar manner define asymmetrical elements.

If the semiconductive body is n-type material denoting an excess of electrons, the emitter electrode in effect injects holes into the semiconductive body. These holes drift toward the collector, thereby increasing the flow of negative charges or electrons to the base. The holes, therefore, are the anomalous current carriers. This phenomenon is more fully described in chapters 1–3 of the above-mentioned book by Shockley. The injection of the holes arises with n-type material due to the type of contact made by the metallic electrode with the semiconductive material and also by the potential difference across the barrier formed by the point contact with the semiconductive body. This has been described merely to point out that the same phenomenon may arise with the diode points, i. e., they may act as hole injectors since they make similar contacts with the semiconductive body, and the potentials across the barriers will also be of the right polarity to induce hole injection. The holes injected by the diode points may also drift toward the collector; and, being random in nature, may produce noise in the output signal. It is for this reason that large area ohmic contacts are generally employed to avoid hole injection by the base electrode. In accordance with another principle of the invention, however, hole injection to an undesirable extent may be avoided by making the wafer of semiconductive material sufficiently thick so that substantially all of the holes injected by the diode points will recombine with negative charges before they reach the collector electrode and thereby have no effect on the current in the collector. The problem may also be avoided by employing a semiconductive wafer of sufficiently large area and placing the pair of closely spaced electrodes which define the emitter and collector electrodes at points remote from the points of contact of the diode points. Further, the use of certain materials, of which tungsten is one, for the diode points 16, 17, and 18 helps minimize hole injection.

It may be seen that the structure of the device is greatly simplified by eliminating the need of a low resistance contact for the base electrode. The semiconductive wafer may be entirely supported by insulating material, and the only external connections needed are those obtained with the connectors 19.

Fig. 2 illustrates a circuit application of the device just described. This circuit is more fully described in my copending application, Serial No. 268,218, filed of even date herewith, now Patent 2,676,271, which issued April 20, 1954. This circuit is a transmission type amplifying electronic gate connected to gate signal energy from an input 21 to a load 22. A first circuit interconnects the emitter electrode 14 with the diode point 16 which is arbitrarily designated the base electrode. A second circuit interconnects this same diode point with the collector electrode. The latter circuit also includes a source of potential 23, the collector supply, and a current limiting or load resistor 24.

The diode point 16 defines an asymmetrically conducting impedance element similar to a conventional crystal diode, as described above, as do also the points 17 and 18. Assuming the semiconductive body to be n-type material, the direction of normal collector current in the active region will be out of the collector electrode and into the base electrode. The collector current will also normay exceed the emitter current which flows from the emitter electrode into the semiconductive body and out of the base electrode. Therefore, omitting consideration of the circuits including the sources of control potential 25 and 26, the asymmetrical device defined by the diode point 16 and the semiconductive body will normally be biased in its low resistance or forward condition. Further, due to the small voltage drop across this element when in this condition, the base of the the semiconductive wafer will be slightly negative with respect to ground, which is arbitrarily taken at point 27, thereby providing positive bias for the emitter electrode 14. If the control potentials are both negative with respect to the potential of the base, the asymmetrical elements defined by the diode points 17 and 18 will be biased in their high resistance condition and will have substantially no effect on the forward transmission of a signal from the input 21 to the load 22. In other words, if the control voltages are both negative, the switch will be "on." If either control voltage is positive, it will bias the asymmetrical element with which it is associated to its low resistance condition and turn the switch "off" by applying a positive voltage to the base which biases the asymmetrical device defined by the point 16 to its high resistance condition and in effect biases the emitter electrode negative with respect to the base. Therefore, the switch may be turned "off" by applying a positive control voltage to either of the diode points 17 or 18 by means of the source 25 or 26.

As more fully described in my copending application, the normally "on" gate shown in Fig. 2 may be modified to a normally "off" gate by returning both of the diode points 17 and 18 to a positive bias so that they are normally biased in their low resistance condition. The normally "off" gate will be turned "on" to pass a signal from the input to the load if both control voltages are simultaneously negative.

Although the invention has been described as relating to a particular embodiment, other embodiments and modifications will readily occur to one skilled in the art so that the invention should not be deemed limited to the device specifically described. For example, more diode points may be included if it is desired to operate the gate or other device in response to more than two control voltages. Further, additional amplifying contacts, i. e., additional "emitters," could be added, if desired, as shown in A. J. Rack Patent 2,476,323, dated July 19, 1949. If p-conductivity type material is employed for the semiconductive body, current directions and voltage polarities will in general be the reverse of those described above. It should also be understood that the use of the device as a transmission type gate is merely illustrative and not restrictive.

What is claimed is:

1. A circuit element consisting of a body of semiconductive material, a pair of closely adjacent point contacts bearing against a surface of said body with a fixed spacing, a plurality of point contacts bearing against a surface of said body at points more remote from both of the points of contact of said pair than said fixed spacing, said pair of contacts, said body, and one of said plurality of point contacts defining a current multiplication device, and said plurality of point contacts and said body defining a plurality of rectifiers.

2. A circuit element comprising a wafer of semiconductive material, point contact transistor emitter, transistor collector, and transistor base electrodes, said emitter and collector electrodes making point contact with one side of said wafer with a close fixed spacing, a plurality of electrodes making point contact with the other side of said wafer at points more distant from said emitter and collector than said spacing, one of said electrodes of said plurality including said base electrode, and each of said plurality of electrodes and said wafer defining asymmetrically conducting impedance elements.

3. The combination in accordance with claim 2, wherein said semiconductive material comprises germanium.

4. An amplifying electronic gate comprising a cylindrical housing, a wafer of semiconductive material laterally supported within said housing, a pair of closely spaced electrodes making point contact with one side of said wafer, a plurality of electrodes making point contact with the other side of said wafer, circuital means interconnecting each of the electrodes of said pair with one of the electrodes of said plurality, and means for applying control potentials to each of the other electrodes of said plurality.

5. A transistor gate comprising a body of semiconductive material, a pair of closely adjacent point contacts bearing against a surface of said body, a transistor base region in said body having a surface portion remote from the points of contact of said pair, a plurality of point contacts bearing against said remote surface portion and making rectifying contact therewith, said pair of contacts, said body, and one of said plurality of point contacts defining a transistor, and each of said contacts of said plurality, other than said one, defining a gate input to said transistor for biasing said base region to a state where no transistor action obtains on the application of an appropriate signal thereto.

6. A circuit element comprising a body of semiconductive material, point contact emitter, collector, and base electrodes, said emitter and collector point contacts being closely adjacent and bearing against a surface of said body with a fixed spacing, at least one other point contact, said base and other point contacts each bearing against a surface of said body at points more remote from the points of contact of said emitter and collector than said fixed spacing.

References Cited in the file of this patent

UNITED STATES PATENTS

| | | |
|---|---|---|
| 2,476,323 | Rack | July 19, 1949 |
| 2,502,479 | Pearson | Apr. 4, 1950 |
| 2,524,035 | Bardeen et al. | Oct. 3, 1950 |
| 2,560,579 | Kock et al. | July 17, 1951 |
| 2,600,500 | Haynes et al. | June 17, 1952 |
| 2,609,429 | Law | Sept. 2, 1952 |
| 2,655,607 | Reeves | Oct. 13, 1953 |
| 2,660,624 | Bergson | Nov. 24, 1953 |